United States Patent [19]

Brougham et al.

[11] Patent Number: 4,628,867
[45] Date of Patent: Dec. 16, 1986

[54] WATER SUPPLY TO WATERING TROUGHS

[76] Inventors: Peter H. Brougham, Tumby Bay, South Australia, Australia, 5605; Raymond B. Reynolds, Port Neil, South Australia, Australia, 5604

[21] Appl. No.: 581,876

[22] Filed: Feb. 16, 1984

[30] Foreign Application Priority Data

Feb. 16, 1983 [AU] Australia ............................... PF8064

[51] Int. Cl.$^4$ ............................................. A01K 7/04
[52] U.S. Cl. .................................................... 119/78
[58] Field of Search ........................ 119/78, 72, 74, 79, 119/80; 137/409

[56] References Cited

U.S. PATENT DOCUMENTS

| | | |
|---|---|---|
| 1,786,024 | 12/1930 | Olson ................................. 119/78 |
| 1,811,375 | 6/1931 | Wysong ............................. 119/72.5 |
| 3,948,221 | 4/1976 | Wiuniski ............................ 119/78 |
| 4,130,090 | 12/1978 | Bohlmann .......................... 119/78 |
| 4,313,048 | 1/1982 | Holbrook .......................... 119/5 |

FOREIGN PATENT DOCUMENTS

| | | |
|---|---|---|
| 111993 | 12/1940 | Australia . |
| 112768 | 4/1941 | Australia . |
| 418767 | 12/1971 | Australia . |
| 2067045 | 5/1982 | United Kingdom ............... 137/409 |

Primary Examiner—Hugh R. Chamblee
Attorney, Agent, or Firm—Cushman, Darby & Cushman

[57] ABSTRACT

A riser for a stock watering trough, the riser being adapted to be attached to a plastic pipe and having clamping means to clamp the riser to the end of the watering trough.

4 Claims, 2 Drawing Figures

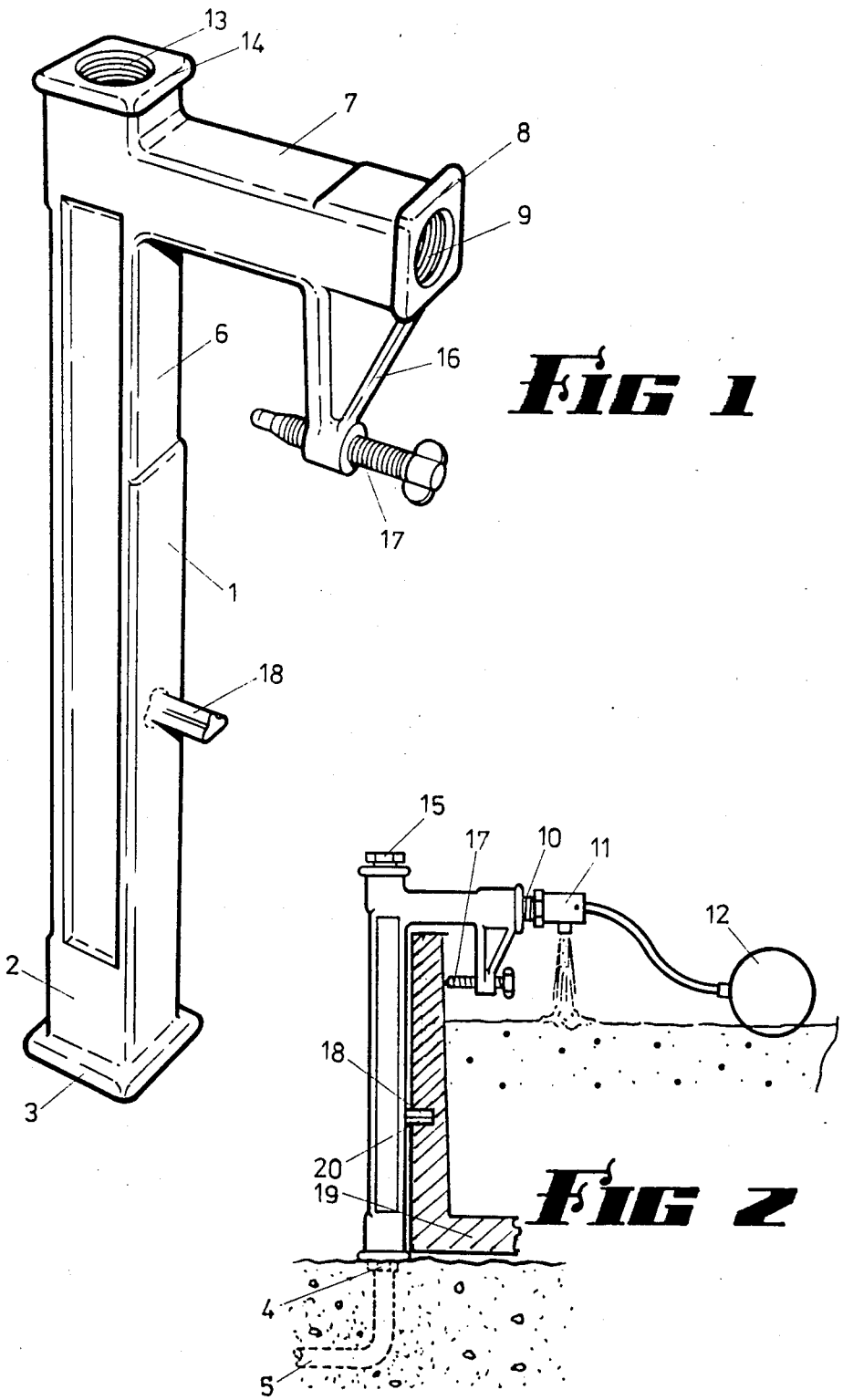

WATER SUPPLY TO WATERING TROUGHS

This invention relates to the water supply to watering troughs, particularly the watering troughs for supplying drinking water for animals.

BACKGROUND OF THE INVENTION

In large areas of Australia the only drinking water available for animals is that supplied by drinking troughs, and often this water is obtained from bores or water supply channels. Often this water while it is suitable for stock usage, does contain large amounts of dissolved salts and the like.

The supply of the water to the troughs is conventionally by polypropylene hose, this being laid underground and is desirable for the use due to the fact that it is corrosion free, and there is little or no tendency for a build up of scale and corrosion on the interior of these hoses.

Conventionally the polypropylene hose terminates at the bottom of the drinking trough, there being fitted by a suitable fitting to the end of the polypropylene house a galvanised iron pipe which acts as a riser up the end of the drinking trough and terminates at its upper end in an elbow to which is attached a conventional float operated valve, this all being protected by a cover.

However with much of the water which is available for use by stock as above indicated, there is a ready tendency for corrosion and corrosive build up of material within the galvanised pipes so that often after a period of only twelve months or so the flow is virtually restricted.

It is virtually essential that the riser pipe be a solid rigid pipe so that it is able to withstand the bumping and knocking and forces applied to it by the rubbing of animals on the pipe, which in effect precludes the use of extending the polypropylene hose up the end of the trough as a riser. Attempts have been made to extend the polypropylene hose, but as this is easily bent, deflected and moved, and also deteriorates under the action of the ultra-violet rays from the sun, problems have arisen due to breakage and leakage, and also misalignment of the float valve so that wastage of water occurs.

Australian Patent specifications NOSG 111993, 112768 and 418767 disclose various watering troughs having a water inlet pipe, this being of small diameter and due to the art at that time would be of galvanised piping. Similarly U.S. Pat. No. 3948221 does not disclose any details of the pipe to the trough, or the pipe to the control valve.

It is an object of this invention to provide an improved riser at the end of a watering trough which will overcome at least one or more of the above problems.

BRIEF DESCRIPTION OF THE INVENTION

Thus there is provided according to the invention a riser for the supply of water to a watering trough, the riser comprising a riser member of substantial volume, the riser being formed of a rigid material which is not susceptible to corrosion and scale or corrosive build up on the interior of the member.

BRIEF DESCRIPTON OF THE DRAWINGS

In the drawings:
FIG. 1 is a perspective view of the riser, and
FIG. 2 is a part sectional view of a trough to which the riser is fitted.

DESCRIPTION OF THE PREFERRED EMBODIMENT

As shown in the drawings the riser 1 can be moulded of a suitable plastics material, such as U.V. resistant polypropylene. The riser 1 is preferably rectangular in section with a passage there-through of greater cross sectional area than the supply pipe.

At its lower end 2 the riser 1 is provided with a flange 3 having a threaded inlet opening to receive a coupling 4 to attach the riser to the plastic supply pipe 5.

At its upper end 6 the riser is formed with an extension 7, the riser thus being of inverted L shape. The outer end of the extension 7 has a flange 8 having a threaded outlet opening 9 into which is screwed a coupling 10 for the control valve 11 controlled by a float 12 in conventional manner.

The upper end 6 of the riser may be closed, or have a threaded opening 13 surrounded by a flange 14. This opening 13 may be closed by a stopper 15 as shown in FIG. 2, or if desired may have a tap fitted thereto (not shown).

The extension 7 carries a depending bracket 16 having a screw locking bolt or stud 17, and the riser 1 has a protruding leg 18 extending in the same direction as the extension 7.

As shown in FIG. 2 the riser is attached to the trough 19 by placing the leg 18 in a groove or slot 20 in the the trough and the locking stud 17 tightened to lock the riser in position. The distance between the leg 18 and the locking stud 17 is sufficient for the majority of troughs as most troughs have a similar depth.

If the troughs are placed on the ground, the lower end of the riser would extend into the ground and the plastic pipe fitted to the riser underground. Alternatively the riser can be formed of a metal alloy, aluminium or the like, or fibre glass reinforced plastic material, the riser being square, rectangular or circular in cross section. At its lower end the riser may be provided with an end plate which is threaded to receive the polypropylene fitting which is attached to the polypropylene hose or pipe.

At its upper end the riser is provided with a right angled bend to have its upper end protrude over the top of the trough, its upper end also being provided with a fitting to which is attached the conventional float operated valve.

At its upper end also where the pipe passes over the top of the trough, a suitable mounting bracket or the like can be welded or otherwise affixed to the riser, this then being bolted to the top of the trough, so that it is rigidly and securely attached to the trough.

The riser is preferably provided to have a greater interior capacity and have substantial volume, so that there is a reservoir of water in the riser to assist in the filling of the trough, particularly when the supply is from a pump, a bore or the like, the head of water pressure being minimal and often being in the order of three to five or ten pounds per square inch.

In an alternative form the metal riser could be coated by dipping or spraying with a suitable plastics material which would minimise the build up of the corrosion and scale.

It has been found that with some metal alloys there is a minimum build up of corrosion compared with a galvanised iron pipe while with the use of plastics materials this build up is virtually eliminated.

It is also within the concept of the invention to include within the metal riser one or more electrolytic nodes, so that the scale and corrosion and build up does not take place on the metal pipe itself.

It will be seen that the risers can be readily manufactured and installed on a watering trough, the risers either being vertical, or inclined so that they lay flush against the end of the trough, and it is a simple matter to screw the riser onto the fitting on the end of the polypropylene supply hose and attach the conventional float operated valve.

In this way the life of the riser is greatly extended, the build up of corrosion and deposits from the water being either eliminated or delayed to give a satisfactory working life for the riser.

The riser by having attached brackets at the top, or along other portions of the riser if desired securely mounts the riser on the trough so that movement and damage by contact with stock is prevented.

The leg 18 can be shortened but cutting of a portion of the leg so that it will fit into an existing slot in the trough, or a groove a slot can be made into the end of the trough to receive the leg.

Although various forms of the invention have been described in some detail it is to be realised that the invention is not to be limited thereto but can include various modifications falling within the spirit and scope of the invention.

The claims defining the invention are claimed as follows:

1. A riser for the supply of water to a watering trough, the riser being formed of a rigid material, the riser having a passage therethrough of greater cross sectional area than a supply hose to which it is to be attached, the riser having means for connection to said supply hose at its lower end, and at its upper end an extension to extend over the watering trough when attached thereto, a leg on said riser extending from the riser in the same direction as the said extension received by a recess in the outer wall of the trough, a bracket depending from said extension, a clamping stud carried by said bracket for clamping said riser to said trough, and means on the end of said extension for regulating the supply of water to said trough.

2. A riser for the supply of water to a watering trough as defined in claim 1 wherein said riser is moulded of a U.V. resistant rigid plastics material.

3. The combination of a riser and a watering trough with the riser attached to an end wall of said trough, said riser being moulded of a U.V. resistant plastics material, an extension on said riser at the upper end thereof to extend over the end of the trough, said extension carrying a float controlled valve, a leg on said riser extending in the same direction as said extension and engaging the side of the trough, a bracket depending from said extension and extending into said trough, a locking stud carried by said bracket clamping said riser against the end wall of said trough, and means connecting the lower end of said riser to a supply pipe or hose.

4. The combination of a riser and a watering trough with the riser being attached to an end wall of said trough to be supported thereby, said riser being connected to a non-rigid water supply pipe of a plastics material, said riser being moulded of a UV resistant plastics material, an extension on said riser at the upper end thereof to extend over the end of the trough, said extension carrying a float control valve, a leg on said riser extending in the same direction as said extension and engaging a recess in the end wall of the trough, a bracket depending from said extension and extending into said trough adjacent said end wall, a locking stud carried by said bracket clamping said riser against the end wall of the trough, and connection means connecting the lower end of the riser to said non-rigid water supply pipe whereby said riser is rigidly clamped to and supported by the watering trough.

* * * * *